Patented May 12, 1925. 1,537,665

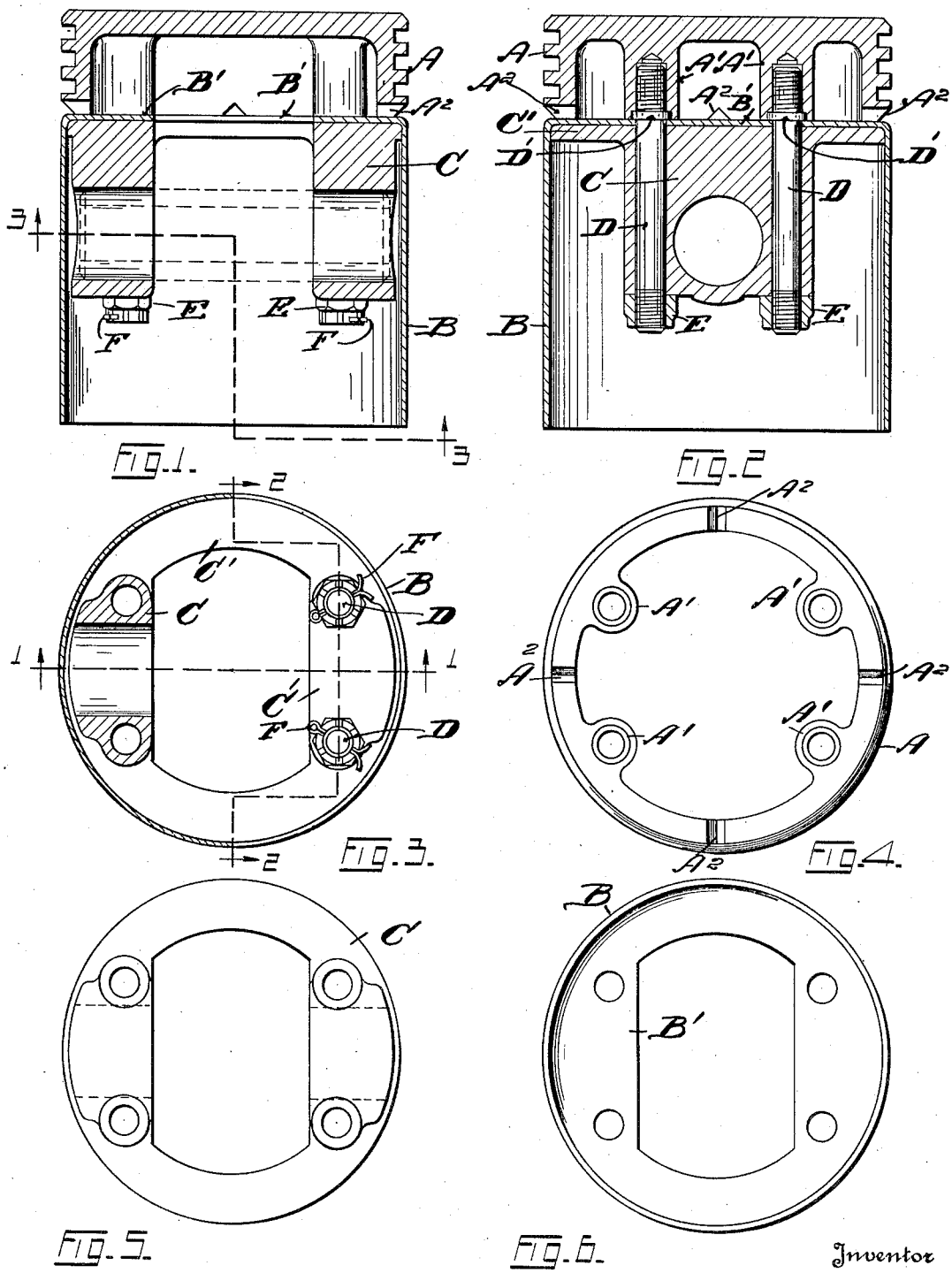

UNITED STATES PATENT OFFICE.

FREDERICK H. FRUE, OF DETROIT, MICHIGAN.

PISTON.

Application filed August 28, 1924. Serial No. 734,565.

*To all whom it may concern:*

Be it known that I, FREDERICK H. FRUE, a citizen of the United States, residing at Detroit, county of Wayne, State of Michigan, have invented a certain new and useful Improvement in Pistons, and declare the following to be a full, clear, and exact description of the same, such as will enable others skilled in the art to which it pertains to make and use the same, reference being had to the accompanying drawings, which form a part of this specification.

My invention relates to an improved piston especially designed for internal combustion engines, shown in the accompanying drawings and more particularly described in the following specification and claims.

The primary object of this invention is to provide a piston of the trunk type, extremely light in construction yet sufficiently strong for the purposes designed.

One feature of this invention is to construct the piston with a thin steel shell or skirt closely fitting the cylinder wall having an inwardly directed flange clamped between a die-cast piston head and a boss-plate fitting, surrounded by the skirt, the parts being clamped together by die-cast studs or bolts, preferably of the same coefficient of expansion as that of the head and which may if preferred be an integral part of the head.

A further object of the invention is to construct the boss-plate fitting so that it may stiffen the skirt encircling the ends of the wrist pin—indicated in dotted lines in Figure 1—the bearing of the boss-plate fitting however being spaced from the annular side wall of the skirt to avoid deflection or distortion of the latter.

Another object of the invention is to employ the overhanging flange of the boss-plate fitting as an oil baffle that oil may be kept away from the head of the piston, thus avoiding carbonization of the oil.

A further object of the invention is to absorb or eliminate "hammer action" by locating the die-cast studs or bolts adjacent the wrist pin.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a vertical cross-sectional view of the piston with the wrist pin in dotted lines taken on or about line 1—1 of Figure 3.

Figure 2 is a vertical cross-sectional view of the piston, taken on or about line 2—2 of Figure 3.

Figure 3 is a cross-sectional view and end elevation of the piston taken or or about line 3—3 of Figure 1.

Figure 4 is an inverted plan view of the piston head.

Figure 5 is a detached end elevation of the boss-plate fitting showing the oil baffle plate formation.

Figure 6 is a detached end elevation of the skirt or shell.

Referring now to the letters of reference placed upon the drawings:

A denotes a piston head formed with a plurality of peripheral grooves $A^1$ to receive the usual piston rings—not shown.

B designates a skirt or sleeve of sheet metal having an inwardly directed flange $B^1$, gripped between the inner face of the head and the upper flange or baffle wall $C^1$ of a boss-plate fitting C, the baffle wall serving to direct the oil back into the cylinder.

D denotes a plurality of die-cast studs or bolts to secure the boss-plate fitting to the piston head and to clamp the flange $B^1$ of the skirt B between the inner face of the head and the boss-plate fitting. The studs or blots D—see Figure 2—being threaded at their upper ends to engage the tapped lugs $A^1$ of the head which are also counterbored to receive the flange $D^1$ of the bolts or studs and which overlaps the inwardly directed flange of the skirt.

E denotes the nuts engaging the lower threaded ends of the bolts, secured by cotter pins F, lodged in the castellated nuts.

$A^2$ indicates a plurality of oil grooves formed in the annular wall of the piston adapted to direct the oil back into the cylinder.

Having now indicated the several parts by reference letters the construction and operation of the piston will be readily understood.

By supporting the wrist pin in a boss-plate fitting detached from but surrounded by the annular wall of the skirt clamped between the boss-plate fitting and the piston head, a self-retaining wrist pin is insured, while the close fitting skirt of the piston is not apt to be distorted by stresses occasioned through said pin, thus the cylinder walls are insured a longer life and are preserved from injury resulting from distortion of the sleeve or skirt.

By constructing the piston with a die-cast head and boss-plate fitting and a thin skirt or shell of drawn steel, reduced manufacturing cost is obtained and lightness, strength, balance and long life is assured.

While the bolts or studs which clamp the flange of the skirt between the head of the piston and boss-plate fitting are shown in the drawings as separate units, it is contemplated forming the head with projecting pins integral therewith to secure the boss-plate fitting to the head. By locating the studs connecting the boss-plate fitting with the head plate adjacent to the periphery of the wrist pin—as indicated in Figure 2 of the drawings—the tendency to "hammer" is overcome.

By providing the boss-plate fitting with a baffle head to direct the oil back into the cylinder the carbonization of the oil due to the intense heat of the piston head is wholly or largely overcome.

Having thus described my invention what I claim is:

1. A piston comprising a head portion of relatively light metal; a skirt adapted to closely fit the cylinder wall having an inwardly directed flange overlapping the inner end of the head; a boss-plate fitting supported within the skirt having a flange overlaying the flange of the skirt and cooperating with the end of the piston head to grip the flange of the skirt and also to serve as an oil baffle plate, the downwardly directed portion of said boss-plate fitting in which the wrist pin is mounted being in spaced relation to the wall of the skirt, and a plurality of studs connecting the head with the boss-plate fitting and extending through the flange of the skirt, whereby the flange of said skirt is gripped between the boss-plate fitting and the piston head.

2. A piston comprising a head portion; a skirt adapted to closely fit a cylinder wall having an inwardly directed flange overlaying the inner end of the head; a boss-plate fitting supported within the annular wall of the skirt having a flange overlaying the flange of the skirt and cooperating with the end of the piston to grip the flange of the skirt; the downwardly directed portion of said boss-plate fitting in which the wrist pin is mounted being in spaced relation to the wall of the skirt, and a plurality of bolts threaded at each end connecting the head with the boss-plate fitting, said bolts having a projecting flange lodged in counterbores provided in the head and overlaying the inwardly directed flange of the skirt and a plurality of nuts engaging the respective bolts at their lower ends, whereby the several elements are bound together as a unit.

In testimony whereof, I sign this specification in the presence of two witnesses.

FREDERICK H. FRUE.

Witnesses:
S. E. THOMAS.
R. V. COUN.